(12) United States Patent
Unfors

(10) Patent No.: US 7,786,449 B2
(45) Date of Patent: Aug. 31, 2010

(54) DEVICE AND ARRANGEMENT FOR SENSING AND DISPLAYING RADIATION

(76) Inventor: Tomas Unfors, Åsberget 4, Billdal (SE) SE-427 35

( * ) Notice: Subject to any disclaimer, the term of this patent is extended or adjusted under 35 U.S.C. 154(b) by 95 days.

(21) Appl. No.: 12/160,108

(22) PCT Filed: Jan. 5, 2007

(86) PCT No.: PCT/SE2007/000008
§ 371 (c)(1),
(2), (4) Date: Jul. 7, 2008

(87) PCT Pub. No.: WO2007/081268
PCT Pub. Date: Jul. 19, 2007

(65) Prior Publication Data
US 2009/0078882 A1 Mar. 26, 2009

(30) Foreign Application Priority Data
Jan. 13, 2006 (SE) .................... 0600056

(51) Int. Cl.
*G01T 1/00* (2006.01)
*G01N 21/00* (2006.01)
(52) U.S. Cl. .................. 250/394; 250/474.1
(58) Field of Classification Search ............. 250/394, 250/388, 361 R, 370.07, 474.1
See application file for complete search history.

(56) References Cited

U.S. PATENT DOCUMENTS

| | | | |
|---|---|---|---|
| 3,614,444 A | 10/1971 | Nirschl | |
| 4,687,622 A | 8/1987 | Longden | |
| 5,132,543 A * | 7/1992 | Valentine et al. | 250/388 |
| 5,256,879 A * | 10/1993 | McNulty et al. | 250/370.06 |
| 6,031,454 A | 2/2000 | Lovejoy et al. | |
| 6,275,747 B1 * | 8/2001 | Wada et al. | 700/266 |
| 7,115,872 B2 * | 10/2006 | Bordynuik | 250/361 R |

FOREIGN PATENT DOCUMENTS

| FR | 2 669 437 A1 | 5/1992 |
|---|---|---|
| JP | 2004-279277 A | 10/2004 |

* cited by examiner

*Primary Examiner*—David P Porta
*Assistant Examiner*—Faye Boosalis
(74) *Attorney, Agent, or Firm*—Young & Thompson

(57) ABSTRACT

An arrangement for detecting and initiating indication of doses of radiation includes radiation dose receiving elements and function handling elements for storing and displaying received radiations/radiation doses. The arrangement is operable by one or several power sources, and includes one or several portable meters exhibiting miniature external dimensions and having internal power sources. The respective meter is provided with radiation receiving elements and function handling elements. Each meter includes one or several preferably continuously connected first components, requiring low power, and temporarily connectable second components, requiring increased or increasing power in relation to the low power. One or several third components, handling the temporary connection and disconnection of the second component or components, is/are included. The first components are activated at low radiation intensities and the second components are connected when high radiation intensities are occurring. The third components connect and disconnect the second components at the different intensities.

20 Claims, 4 Drawing Sheets

DEVICE AND ARRANGEMENT FOR SENSING AND DISPLAYING RADIATION

BACKGROUND OF THE INVENTION

1. Field of the Invention

The present invention relates to an arrangement for detecting and initiating indication of doses of radiation, which can be constituted of ionizing radiation (X-radiation, $\alpha$- and $\beta$-radiation, etc. Advantageously, the arrangement and the meter can also be utilised for measuring radon and solar radiation, and other (dangerous) radiation to which the human body is exposed. The arrangement and the meter, respectively, include radiation receiving means and function handling means for storing and displaying received radiations/radiation doses. Thereby, the means are operable by means of one or several power sources.

2. Description of the Related Art

There is a need of individual meters which can directly warn the user at certain radiation levels and record accumulated doses over time (days, months, years). Today, a number of so called active (battery operated) meter alternatives are available in the market, wherein some are known since about 15 years. The known meters are designed with relatively large external dimensions which are oriented towards science and consume far too much electrical power to be used during a long succession of years without requiring battery change. It is also previously known with so called passive individual dosimeters (non-battery operated) which are used for recording accumulated dose.

There is a need of an integrated individual dosimeter which is small (having a so called thumb-volume) and can be used for at least 5 years with the same non-rechargeable battery. There is also a need of a smaller meter (having a thumb nail-volume) which measures and warns of dangerous radiation and which is intended for measuring substantially shorter time periods. Furthermore, the meter should be resistant to environments which are mechanically difficult, temperature-variable and humid. It should be easily readable with respect to accumulated dose and time-stored values (even values up to about 100 dose values). There is also a need to be able to stimulate and facilitate the desire of ordinary people to utilise the relevant meters. The smallness is of critical importance for easy and natural use of the meter. The use of an internal battery with remarkably small external dimensions contributes to this smallness, and all without having to sacrifice a reliable and clear-cut function. The object of the present invention is to solve these problems entirely or partially.

SUMMARY OF THE INVENTION

The main feature which can be regarded as characterizing of an arrangement according to the invention is, among other things, that it includes one or several portable meters exhibiting miniature external dimensions and having a power source or several power sources assigned thereto. The respective meter is provided with radiation dose receiving means and function handling means of its own, and further includes one or several, substantially continuously connected, first components, requiring low power and being activated at low radiation intensities, one or several, temporarily connectable, second components, requiring increased or increasing electrical power in relation to the low power and being activated at increasing, increased or higher radiation intensities, and also one or several third components, controlling the temporary connection and disconnection of the second component or components when the last-mentioned radiation intensities are starting and ending, respectively.

In further developments of the inventive idea, said function handling means can include first and second function handling means, wherein the respective meter includes the first function handling means and the second function handling means can be located outside the meter and constitute or be included in an actuatable control unit which can be common to a number of, or all, meters. The function handling means and first function handling means, respectively, of the respective meter preferably include a microcomputer, being provided with and/or being connected to memory means, and indicating means, e.g. light indicating means and/or sound emitting means. The first function handling means of the respective meter can further include a circuit for the connectability of the microcomputer to said second function handling unit via wireless or wirebound connection being actuatable e.g. by means of a mobile phone. The respective meter is preferably provided with an internal power source of its own, in the form of a small battery with a capacity of about 400 mAh. Said first component or components can operate with a current consumption in the order 5 $\mu$A, (3-7 $\mu$A). The respective meter can be provided with a power receiving circuit for inductive reception of power arriving from outside of the second function handling means. The meter or meters is/are placeable onto an object, e.g. a human body, and is/are controllable by means of said control unit. The respective meter receives and records radiation which is dangerous to human beings. In one embodiment, one or several meters can include two or several sensors which are assigned to different types of ionizing radiations, wherein the respective sensor can constitute a separate channel together with first, second and third components being assigned thereto.

The main feature which can be regarded as characterizing of a meter according to the invention is, among other things, that its exhibits miniature external dimensions. The meter includes the function handling means, mentioned by way of introduction, which exhibits/exhibit the preferably continuously connected, one or several first components, requiring low power and being activated when receiving low radiation intensities, one or several temporarily connectable second components, requiring an increased or increasing power in relation to the low power and being activated when receiving increasing or higher radiation intensities, and also one or several third components, controlling the temporary connection and disconnection of the second component or components when the increasing or higher radiation intensities are starting and ending, respectively.

In further developments of the inventive idea, specific external dimensions are indicated. The housing can include a base member and a shell shaped cover member, which are sealed against each other by means of sealing means, e.g. a rubber seal or an elastic member and/or glue, preventing moisture penetration. The shell shaped cover member can be replaceable, relative to the base member or base members of the meter, by a new cover member. The function handling means can include sensor arrangements, sampling means and memory means, and also radiation indicating means being made up of components which are substantially insensitive to temperature variation, of a type which is known per se. In one embodiment, said means and components are cooperatable with a battery with long durability time, e.g. 5 years. In another embodiment, there are reduced requirements for durability, which thereby can be reduced substantially and e.g. comprise hours or one or several days. In one embodiment, the sensor arrangement can include one or several sensors, e.g. two sensors, being sensitive to the radiation in question, e.g. X-radiation. Thereby, the arrangement can be such that there is a reduced need of correction for different radiation energies. A lower radiation level can represent a remarkably low level of radiation, e.g. a few photons/min, which normally occurs 99% of the total time which the user is carrying the meter. Thereby, the sensor arrangement can be connected or connectable to a pulse amplifier being part of the first components, said amplifier in its turn being connected or connectable to pulse counting means (a first pulse counter) for said remarkably low radiation level. The first components can be substantially continuously connected, and are of the type requiring remarkably low current consumption, e.g. 5 µA. The second components are temporarily connectable and can include a current/voltage amplifier, a voltage/frequency converter and a second pulse counter being connectable in series, and a voltage/voltage converter being connected in parallel to said voltage/frequency converter and second pulse counter. A third component can include a microcomputer unit with an analogue/digital converter, unit for connecting digital pulse, memory means and connections for displaying means. Furthermore, one or several connections can be included for piezoelectric means and/or light emitting elements being included in the displaying means, e.g. light emitting diodes, which operate with different indicating functions, e.g. colour and/or flash functions, and connection to wireless communication (radio) with time storage memory, and connection to inductive circuit portion for power reception from a unit emitting inductive power being present outside the meter, and located e.g. in said control unit. Said second pulse counter can be connected to the digital connecting unit or the digital in/out unit. In one embodiment, the microcomputer unit is activatable in predetermined intervals from the first pulse counter in dependence of pulses emitted therefrom, representing numbers which the first pulse counter displays when receiving incoming radiation energy. In said interval, the microcomputer unit is handling the temporary connection of the second component or components, all in order to minimize the power consumption. Said handling takes place when the number or numbers totaled in the first pulse counter exceeds/exceed a predetermined number. At such an exceeding number the microcomputer rapidly connects the more power-requiring second components, e.g. within 0.001-10 seconds. Disconnection of the latter preferably occurs equally rapidly when the totaled number or numbers once again falls/fall below the predetermined number or numbers. Alternatively or additionally, the radiation intensity over time can be stored only for temporary reading at the moment in question in order to thereby put a smaller load on the battery. The indicating means preferably include a buzzer which sounds a warning at a radiation intensity or radiation intensities of predetermined magnitude or magnitudes over different times. In one embodiment, the buzzer is of a piezoelectric type which, inversely, can act as a push button which, when being subjected to a mechanical shock, generates an electric signal perceivable as a key stroke. The indicating means can include a green light emitting diode which flashes a number of times per period of time at a radiation intensity and/or accumulated dose which is acceptable or absent. Alternatively or additionally, the indicating means can also include an orange/yellow light emitting diode which gives a single flash or several flashes per period of time if the dose intensity exceeds the predetermined level or levels. Alternatively or additionally, the indicating means include a red light emitting diode which gives a flash/several flashes per period of time predetermined level/levels if accumulated dose exceeds the predetermined level/levels.

A readily portable miniature meter sensitive to radiation, e.g. X-radiation and radon radiation, and which warns of high radiation intensities and radiation doses and records accumulated doses of varying magnitudes, is made possible by means of the features proposed in the foregoing. The meter can be carried around and be utilised for a long period of time without replacement of current executing means for a long time, in spite of possible use in said difficult environments. The replaceable shell shaped cover enables the contents of the meter to be reused with another or a new design. The basic structure and the selection of battery and components in the meter enable the miniaturization and the low current or power need, and thereby forms an incentive for stimulating the desire to utilise the meter/arrangement. Alternatively, the meter can be adapted for short-term use and then be arranged with further reduced external dimensions.

BRIEF DESCRIPTION OF THE DRAWINGS

Presently preferred embodiments of an arrangement and a meter according to the invention will be described, while simultaneously referring to the attached drawings, in which.

DETAILED DESCRIPTION OF THE INVENTION

Figure 1:
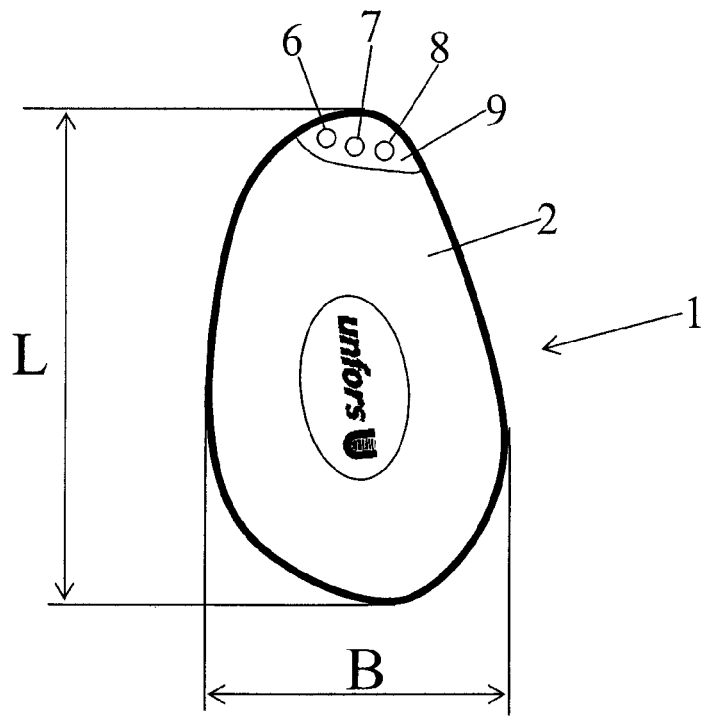
FIG. 1 shows the meter from the front.
Figure 2:
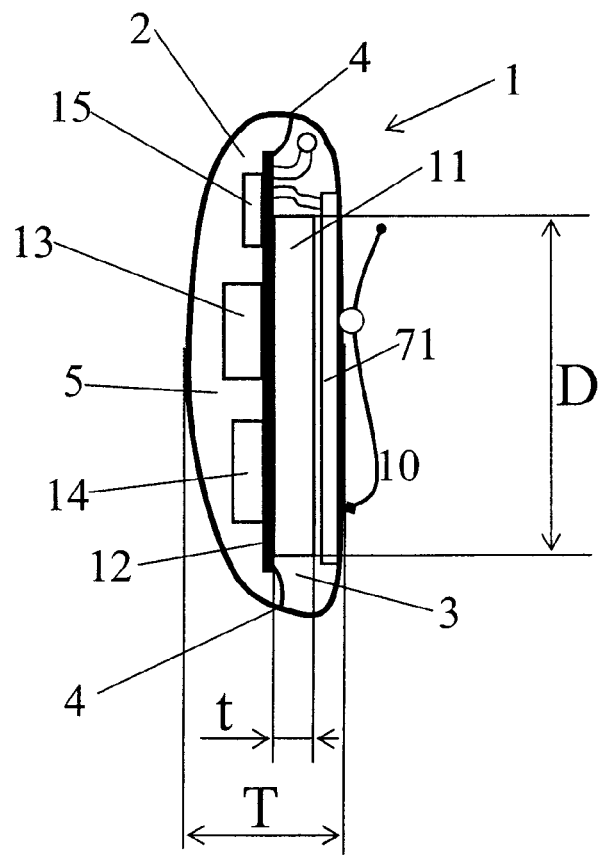
FIG. 2 shows the meter according to FIG. 1 from the side.

In FIGS. 1 and 2, a meter is indicated with 1. The meter exhibits a top member 2 and a base member 3, being mountable together via sealing means 4 in order to be able to form a moisture-proof internal cavity 5. At one end, the meter is provided with light indicating means 6, 7 and 8, being visible from the outside through a transparent portion or a window 9. The light indicating means can consist of light emitting diodes which are arranged for being able to light up with green (6), orange/yellow (7) and red (8) light. The top member 2 is shell shaped, whereas the base member exhibits a more straight extension in the view according to FIG. 2. In the view according to FIG. 1, the meter has a substantially oval or crescent shape, and carries said window or the like at a narrowed end member. On its underside, the base member 3 carries fastening means, which can be constituted of a clamp 10, needle, glue, chain, adhesive tape, etc. The meter can be attached to an object or a carrier, e.g. a human being, on which long-term measurement and/or shorter measurement of any occurring radiation is to be made. The material in the meter can consist of plastic (hard plastic), metal, alloy, etc. A battery, preferably with miniature dimensions, e.g. a battery having a diameter D of approx. 20-25 mm and a thickness of approx. 3-5 mm, and with a capacity of e.g. 400 mAh, is disposed inside the enclosed cavity 5 of the meter. For short-term use, as is described in the following, further dimensional reductions, for example into half, can be utilised. The battery is disposed/attached at one side of a printed circuit card 12, which on its other side carries function handling means in the form of one or several sensors 13. ASIC-components 14 and the other electronics 15, the printed circuit card 12 with battery 11, components 15 and displaying means 6, 7, 8 are preferably anchored to the base member 3, and different top members (shells) with different colours, marking, shape, etc. can be applied onto the base member as desired.

Figure 3:
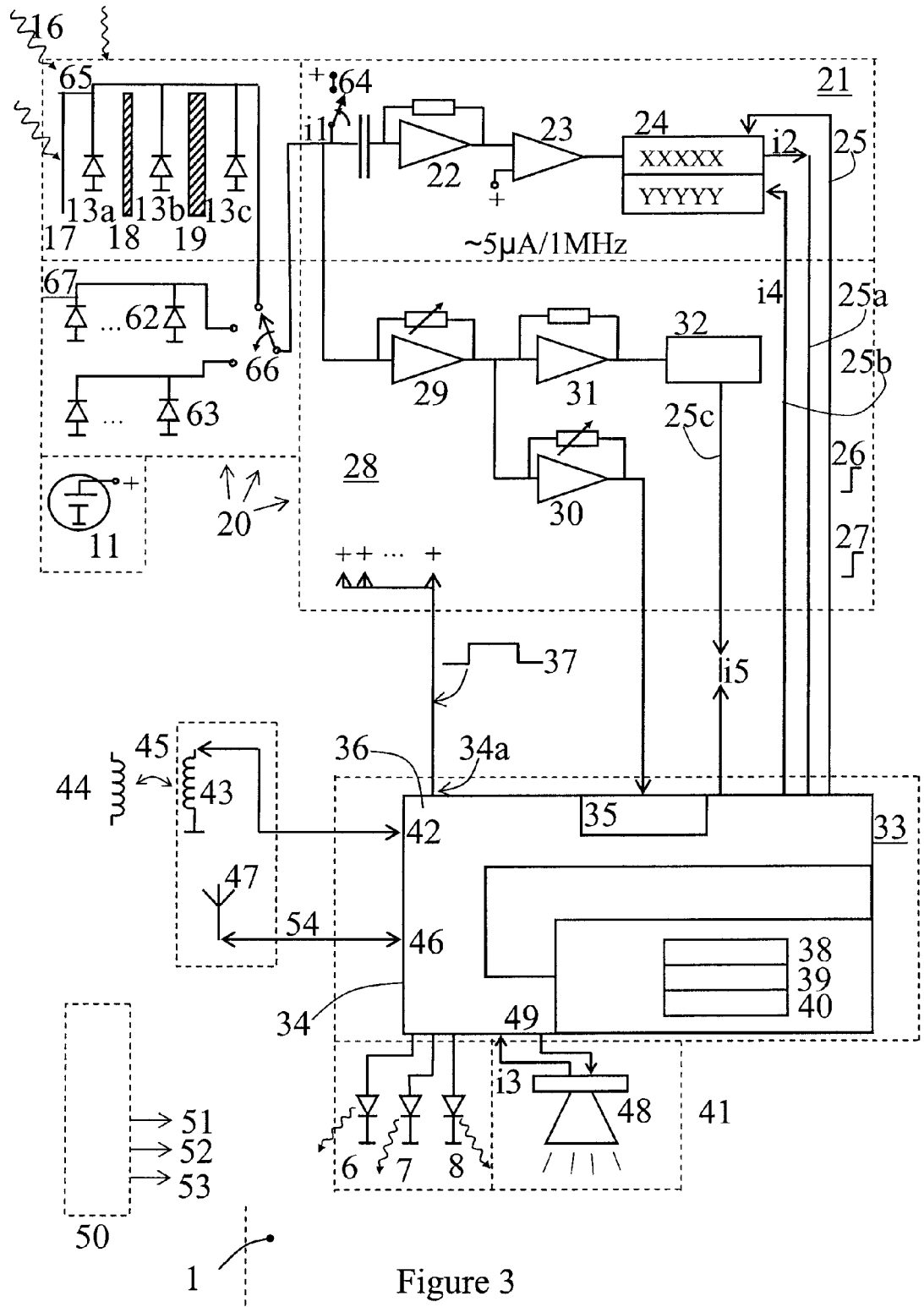
FIG. 3 shows function handling and displaying means being included in the meter in schematic form.

In FIG. 3, symbolically indicated radiation, e.g. X-radiation or other radiation dangerous to humans, incides towards the meter 1, which has been indicated only symbolically in FIG. 3 by means of its cover or shell. The radiation is detected by the sensors 13a, 13b and 13c, being cooperatable with filters 17, 18, 19 in a way known per se. The sensors convert the radiation into electrical signals i1, which are processed in function handling means 20 being included in the meter. The battery 11 is supplying power to the function handling means in a way known per se. The function handling means 20 include first components 21, being of the type requiring remarkably little power in order to operate. In the first components, a pulse amplifier 22 and a comparator being connected to the output of the same, wherein the output of said comparator 23, in its turn, is connected to a pulse counter 24. Said first components are operating with, among other things, a sampling function, and can also be regarded as or include sampling means. The pulse counter 24 is adjusted or adjustable to deliver a pulse or pulses on its output 25 having intervals which can vary in dependence of the radiation intensity and activate the microcomputer accordingly. The microcomputer reacts if the interval is shorter than a normal interval which is specified in the computer. The pulse counter totals numbers in dependence of received pulses and the microcomputer reads the number (numbers) and compares it or them with its own number. At a predetermined similarity, connection of the second components takes place. Activating pulses are exemplified with 26 and 27 and occur at an indicated time interval T. The function handling means also exhibit second components 28, including or consisting of a current/voltage amplifier 29 and a voltage/voltage amplifier 30 being connected in series with said current/voltage amplifier. A voltage/frequency amplifier 31 and a pulse counter, here denoted second pulse counter 32, are arranged in parallel to the unit 30.

The function handling means also include a microcomputer unit 33 with a microcomputer 34, which can be constituted of a microcomputer known per se. The microcomputer is provided with an analogue-digital converter 35 which is connected to the output of the amplifier 30. The microcomputer also includes an incoming and an outgoing digital connecting unit 36, being connected to the output on the second counter 32. Via said unit 36, the microcomputer is also connected to the output on the second pulse counter 24, and thus receives the numerical signals 26, 27 occurring at certain intervals T. In dependence of the reception of said numerical signals 26, 27 and the numeric state in the counter 24, the microcomputer activates an initiating pulse 37 at an output on the unit 36, by means of which the microcomputer activates the second components. The second components 28 are of the type requiring a higher power consumption than the first components 21. By means of a pulse or pulses 37, the microcomputer can thus activate the second component for a predetermined time, i.e. activate them temporarily. Accordingly, by means of the arrangement having the first and second components and the microcomputer, the first components can continuously inform the microcomputer about the fact that they are activated, i.e. continuously activated, whereby the microcomputer can connect the other, more power requiring, second components 28 for short predetermined intervals at increased or higher radiation intensity.

In a known way, the microcomputer includes programming circuits 38, and memories 39, 40. The memories can be of different types and, accordingly, so-called volatile memories 39 and non-volatile memories 40 can be utilised. The last-mentioned memories are more power requiring than the volatile memories. The microcomputer is connected to a displaying unit 41 which includes the above-mentioned light emitting diodes 6, 7 and 8. The microcomputer is of the type which, in way known per se, exhibits terminal pins or terminal legs for the different functions descried in the foregoing. The microcomputer is in one embodiment, via connection 42 in unit 36, connected to an inductive circuit portion 43, being cooperatable with an inductive circuit portion 44 being arranged outside the meter. Accordingly, during passage through the portion 44, inductive power 45 can be transferred to the coil 43 and be brought into the microcomputer. A connection 46 on the microcomputer can also be connected to or constitute an input and/or output for a wireless connection, which has been symbolized with an antenna 47. The microcomputer is also connected to a piezoelement 48, being connected to the microcomputer via a connection 49. The element 48 is adapted to emit a sound signal in dependence of a signal i2 from the counter 24 in the first components. The element 48 can operate with an inversed function and, when being subjected to knocking or mechanical actuation, initiate a signal i3 in the opposite direction relative to the buzzer 48 for activation of a function, e.g. memory detection, to or towards the first components. The first components are of the type requiring about 5 µA in order to operate. The pulse amplifier operates within a band width region of 1 MHz. The meter according to FIG. 3 can operate independently or in cooperation with other meters, being at least substantially similarly made up. Such an interaction can take place via controlling or interacting means 50, being located outside the meter, and can e.g. include the inductive portion 44. Accordingly, the controlling portion 50 can interact with several meters and interactions with three metes have been symbolized with arrows 51, 52 and 53. The microcomputer can also acquire frequency power 54 via the wireless connection or radio connection 47.

The microcomputer 34 causes connection of electrical power supply via the connection to the different blocks of the second components, which can take place in a way known per se. Biasing is connectable in accordance with the following. In FIG. 3, a first number in the counter 24 is symbolized with xxxxx. At selected intervals, this number is transferred to the microcomputer 34, which in its turn emits information i4 about a number yyyyy set in the computer, which is compared with the radiation intensity received within the respective interval by the counter. When the compared numbers exhibit a predetermined mutual relation, e.g. that they are the same, the counter 24 transmits the activating pulses 26, 27 on the connection 25, and thus activates the microcomputer so that it, in its turn, activates the second components via the connection 34a and, among other things, connects the second components and their battery supply. The microcomputer exchanges signals i5 with the second counter 32 in connection with the activation of the second components. The connections between the microcomputer and the counter 24 are indicated with 25, 25a and 25b, whereas the connection between the microcomputer an the counter 32 is indicated with 25c. The number yyyyy can correspond to a dose of about 1 µSv.

Figure 4:
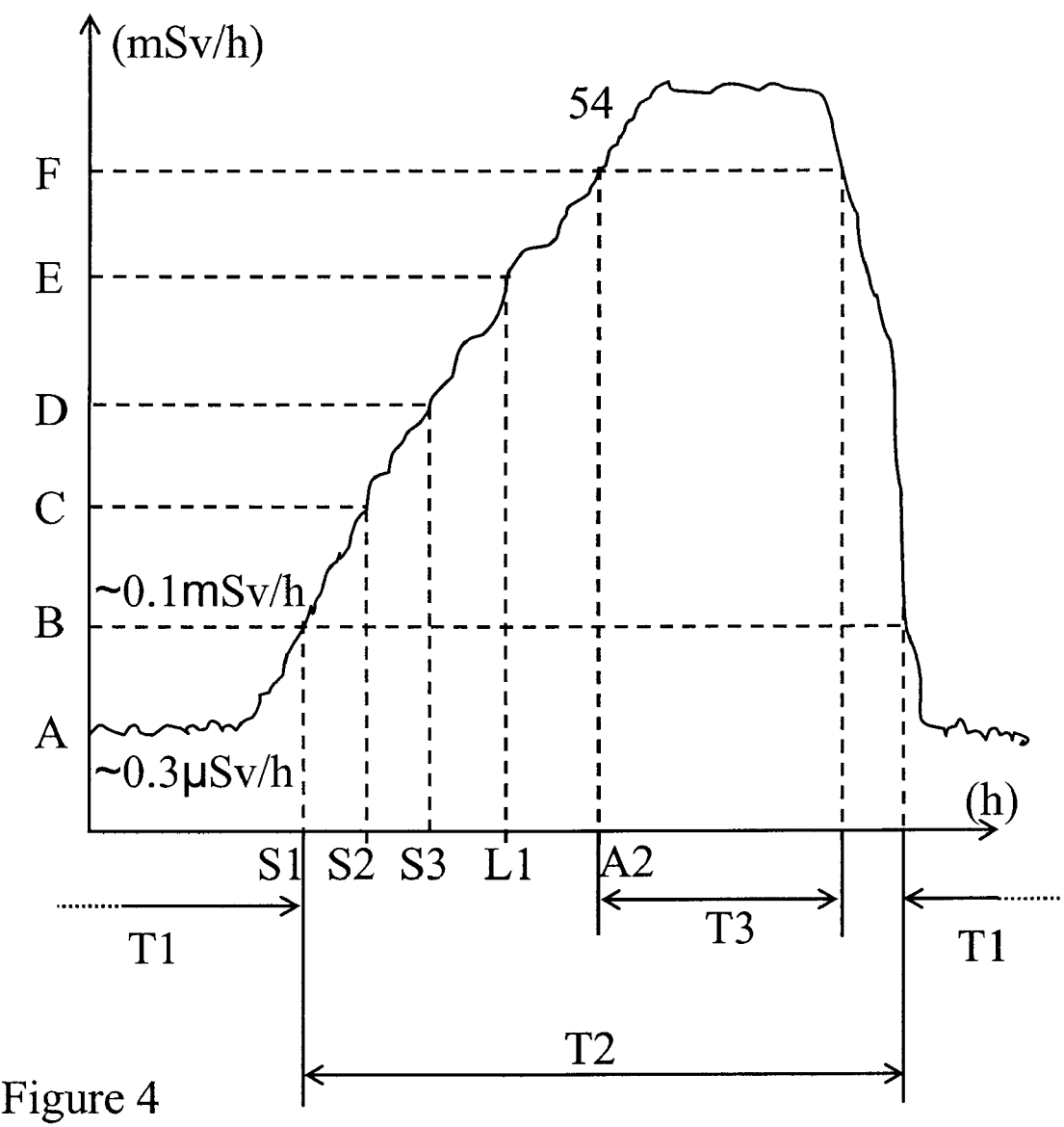
FIG. 4 shows examples of radiation intensity over time in diagrammatic form, and wherein different initiations of the displaying means are starting and ending.

FIG. 4 shows examples of reception of radiation over a certain time. The vertical axis indicates intensity in mSievert per unit of time (hour) and the horizontal axis time, e.g. in hours or days or weeks, months, years, etc. A represents the reception of a low dose level A during a time portion T1. The low dose level is present during a very large portion of the time of use of the meter in long-term use, e.g. approx. 99% of this time. The curve representing the received radiation is denoted 54. The level B of the intensity constitutes a warning level one, whereas C and D constitute warning levels two and three, respectively. Level E indicates a storage level. At these levels, the meter primarily operates only with the first components, which require the less demanding energy consumption. At level F, the radiation or intensity has increased to a value where also the second components (28 in FIG. 3) are connected more permanently. Such peaks in the received intensity are usually of a temporary nature for meters in long-term use.

T1 constitutes a time period where the pulse counter 24 is read each 3-5 seconds by the otherwise disconnected microprocessor (34 in FIG. 3). At time S1, i.e. where the warning level B has been achieved, a single beep signal is emitted from the element (48) and/or the orange/yellow light emitting diode (7) is lighted with a single flash. At S2, which indicates that the intensity has increased to the level C, a single beep is initiated on the element (48), at the same time as the orange/yellow light emitting diode is activated and emits a double flash. In a corresponding way, at S3, single beep is caused to be omitted and the orange/yellow light emitting diode gives a triple flash. At L1, which represents the level E, storage of individual samples into the memory (39 and/or 40) takes place. This storage can take place every second/every tenth second/every minute/every tenth minute, etc. At A2, which indicates the level F, connection of the second components takes place. When the intensity falls below the level F, the power to the other components is disconnected, etc. T2 indicates examples of when the intensity exceeds the normally received low intensity, cf. T1.

Storage of accumulated dose takes place continuously. If the accumulated dose exceeds certain limit levels, a single beep signal and a single/double/triple flash on the red light emitting diode (8) are emitted. Furthermore, in one embodiment, storage of accumulated dose into a non-volatile memory (40), being more power-requiring than storage into a volatile memory, can take place every hour, or every tenth, twenty-fourth hour, etc.

When controlling or reading, three alternative cases can occur, wherein a key stroke is executed in the first case by means of knocking the meter/element (48) against a hard support. In a second alternative, a predetermined frequency can be received from another base unit via the radio communication connection (47). Alternative three concerns inductive functions or readings. Accordingly, reading of accumulated dose can take place from the outside and no energy consumption from the internal battery (11) needs to occur in this case. Programming of the meter can be done via the terminal strip unit (50) or the communicating connection (47). Programming of the programming circuit 38 of the microcomputer can take place according to a known programming method. In those cases where the meter (meters) operates (operate) with function handling means being present inside the meter and being present outside the meter, these are denoted first and second function handling means, respectively. The respective meter can be designed with several channels 62, 63, which each can be assigned function handling means of its own or entirely or partially share the same function handling means. The bias determining circuit for the counters is indicated with 64, and the detecting unit with filters and sensors has the designation 65. The channels 62, 63 are connectable one by one by means of switching means 66. The block with the channel functions has the designation 67. Parts which are not described here are of a type known per se, having functions which are evident from the context. In one embodiment, the first components can be disconnected when the second components are connected, and vice versa.

Figure 5:
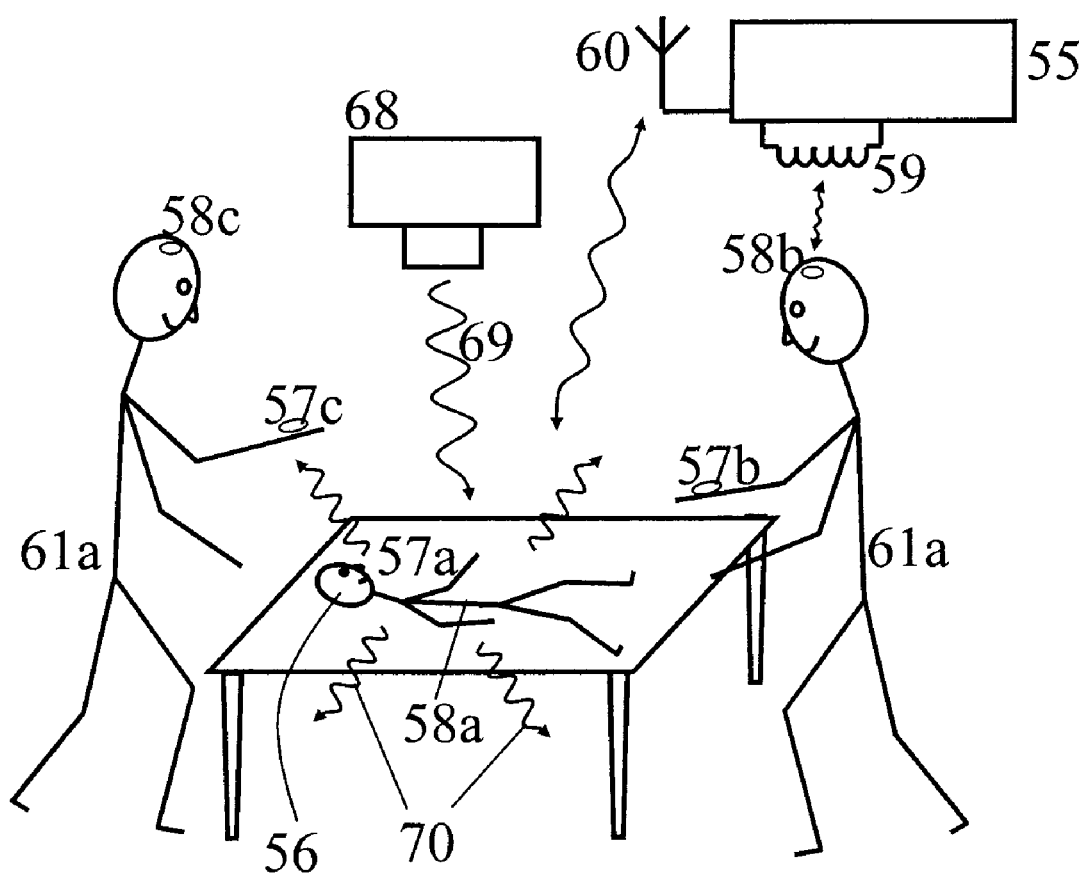
FIG. 5 shows utilisation of the meter/arrangement on a patient during an X-ray investigation in principal diagram form.

FIG. 5 shows examples of an arrangement where a number of meters are interacting via a central unit 55. The short-term meters (thumbnail meters) are applied onto a patient 56 or an other object in question. Two of the meters have been indicated with 57a and 58 a. The respective meters can be in contact with the central unit 55 via one or several inductive circuits 59 and/or via wireless connection 60. Staff members working with the patient during the radiation treatment or radiation are symbolized with 61a and 61b. The staff members carry the meters 57b and 58b and 57c and 58c, respectively, in question. The patient and the staff members are subjected to radiation, e.g. X-ray equipment (tubes) 68 producing direct radiation 69. Also secondary radiation 70 at the place of work can be measured. In the embodiment according to claim 5, much smaller batteries can be used in the respective meters being used on the patient than in the case of long-term meters. Furthermore, the light emitting diodes (6,7, 8) can be omitted, which all together makes it possible with meters of thumbnail size. The battery time can be selected to be remarkably short, e.g. 24-100 hours. In FIG. 2, the buzzer has the reference numeral 71.

The invention is not limited to the exemplary embodiment shown above, but can be subjected to modifications within the scope of the following claims and the inventive idea.

The invention claimed is:

1. An arrangement for detecting and initiating indication of doses of radiation (16), comprising:
    means for receiving radiation dose (13a, 17; 13b, 18; 13c, 19); and
    means for function handling (20) for storing and displaying received radiations/radiation doses,
        said means for function handling being operable by one or several power sources (11), including one or several portable meters (1) exhibiting miniature external dimensions and having a power source assigned thereto, and wherein the respective meter is provided with a means for receiving radiation dose and a means for function handling of its own,
    wherein said meter includes one or several first components (22, 23, 24), requiring low power and being activated when receiving low radiation intensities, one or several temporarily connectable second components (29, 30, 31, 32), requiring increased or increasing electrical power in relation to the low electrical power and including a current/voltage amplifier (29) being activated when receiving increased or higher radiation intensities, and one or several third components (33), handling a temporary connection and disconnection of the second component or components when the increased or higher radiation intensities are starting and ending, respectively.

2. The arrangement according to claim 1, wherein said means for function handling (20) include first and second means for function handling, wherein the respective meter includes the first means for function handling, and the second means for function handling (50) is located outside the meter (1) and constitute or are included in an actuatable control unit.

3. The arrangement according to claim 2, wherein the means for function handling (20) and the first means for function handling of the meter, respectively, include a microcomputer (34), including and/or being connected to means for memory (39, 40), and means for indicating means for indicating light (6, 7, 8) and/or means for emitting sound (40).

4. The arrangement according to claim 1, wherein the respective meter (1) is provided with a power receiving circuit (43) for inductive reception of power arriving from outside the second means for function handling (44, 50).

5. The arrangement according to claim 1, wherein one or several meters includes/include two or several sensors (62, 63) compensating for different types of radiation energies.

6. A meter (1, 57, 58) for detecting and initiating indication of doses of radiation (16), comprising:
   means for receiving radiation dose; and
   means for function handling (20) for storing and displaying received radiations/radiation doses,
   said means for function handling being operable by one or several power sources (11), and exhibiting miniature external dimensions,
   wherein said means for function handling (20) include one or several continuously connected first components (21), requiring low electrical power and being activated when receiving low radiation intensities, one or several temporarily connectable second components (28), requiring increased or increasing electrical power in relation to the low electrical power, including a current/voltage amplifier (29), and being activated when receiving increased or higher radiation intensities, and one or several third components (33), controlling the temporary connection and disconnection of the second component or components when the increased or higher radiation intensities are starting and ending, respectively.

7. The meter according to claim 6, wherein the means for function handling (20) includes/include sensor arrangements (13a, 17; 13b, 18; 13 c, 19), means for sampling and means for memory, and means for indicating radiation (6, 7, 8, 48) are substantially insensitive to temperature variation.

8. The meter according to claim 7, wherein the means for radiation indication includes a piezoelectric element (48), wherein said means for radiation indication includes a buzzer, which inversely functions as a push button by generating a an electric signal, being perceivable as a key stroke, when the push button is subjected to a mechanical impact.

9. The meter according to claim 7, wherein the means for radiation indication are light emitting elements including a green light emitting diode (6) flashing a number of times, or once per time period, or once per minute, when radiation intensity and/or accumulated dose is acceptable or absent, and/or an orange/yellow light emitting diode (7) giving single, double or triple flash during the time period, if a dose intensity exceeds a predetermined level (one, two, three) and/or a red light emitting diode (8) giving single, double or triple flash during the time period, if an accumulated dose exceeds the predetermined level (one, two, three).

10. The meter according to claim 6, wherein the first components (21) include a first pulse amplifier (22), a comparator and a pulse counter (24) being connected in series.

11. The meter according to claim 10, wherein the pulse counter (24) is connected to the digital in/out unit (36), and that a microcomputer unit (34) is activatable in predetermined intervals by said pulse counter (24) in dependence of pulses (26, 27), being emitted therefrom and representing numbers generated by the counter (24), and that the microcomputer unit (34) is handling said temporary connection of the second component or components (28) via a signal pulse (37).

12. The meter according to claim 6, wherein the second components (28) include a voltage/frequency converter (31) and a second pulse counter (32) being connectable in series, and a voltage/voltage converter (30) being connected in parallel to said voltage/frequency converter and second pulse counter.

13. The meter according to claim 6, wherein the third component or components is/are handling the temporary connection and disconnection by detecting the reception, by the first component or components, of the reception of radiation, by the means for radiation dose receiving.

14. The meter according to claim 13, wherein the first component or components detects/detect pulses caused by the low received radiation intensity and, in dependence of the pulses, generates/generate numbers at a predetermined interval or predetermined intervals.

15. The meter according to claim 14, wherein t the third component or components detects/detect said number/numbers and, when exceeding or falling below this or these, connects/connect or disconnects/disconnect the second component or components.

16. The meter according to claim 15, wherein the third component or components connects/connect or disconnects/disconnect the increasing or higher electrical power immediately/rapidly, or within 0.001-10 seconds.

17. An arrangement for detecting and initiating indication of doses of radiation (16), comprising:
   at least one sensor configured for receiving radiation dose (13a, 17; 13b, 18; 13c, 19); and
   a function handler (20) configured for storing and displaying received radiations/radiation doses,
   said function handler (20) being operable by at least one power source (11), including at least one portable meter (1) exhibiting miniature external dimensions and having a power source assigned thereto, and wherein the respective meter is provided with a sensor configured for receiving radiation dose and a function handler of its own,
   wherein said meter includes one or several first components (22, 23, 24), requiring low power and being activated when receiving low radiation intensities, one or several temporarily connectable second components (29, 30, 31, 32), requiring increased or increasing electrical power in relation to the low electrical power and including a current/voltage amplifier (29) being activated when receiving increased or higher radiation intensities, and one or several third components (33), handling a temporary connection and disconnection of the second component or components when the increased or higher radiation intensities are starting and ending, respectively.

18. The arrangement according to claim 17, wherein said function handler (20) includes first and second function handlers, wherein the respective meter includes the first function handler, and the second function handler is located outside the meter (1) and constitute or are included in an actuatable control unit.

19. The arrangement according to claim 18, wherein the function handler (20) and the first function handler the meter, respectively, include a microcomputer (34), including and/or being connected to a memory (39, 40), and an indicator, a light indicator (6, 7, 8) and/or a sound emitter (40).

20. The arrangement according to claim 17, wherein the respective meter (1) is provided with a power receiving circuit (43) for inductive reception of power arriving from outside the second function handler (44, 50).

* * * * *